No. 753,571. PATENTED MAR. 1, 1904.
S. M. HAMBLIN.
MACHINE FOR WRAPPING CANDY KISSES, &c.
APPLICATION FILED DEC. 11, 1903.
NO MODEL. 2 SHEETS—SHEET 1.
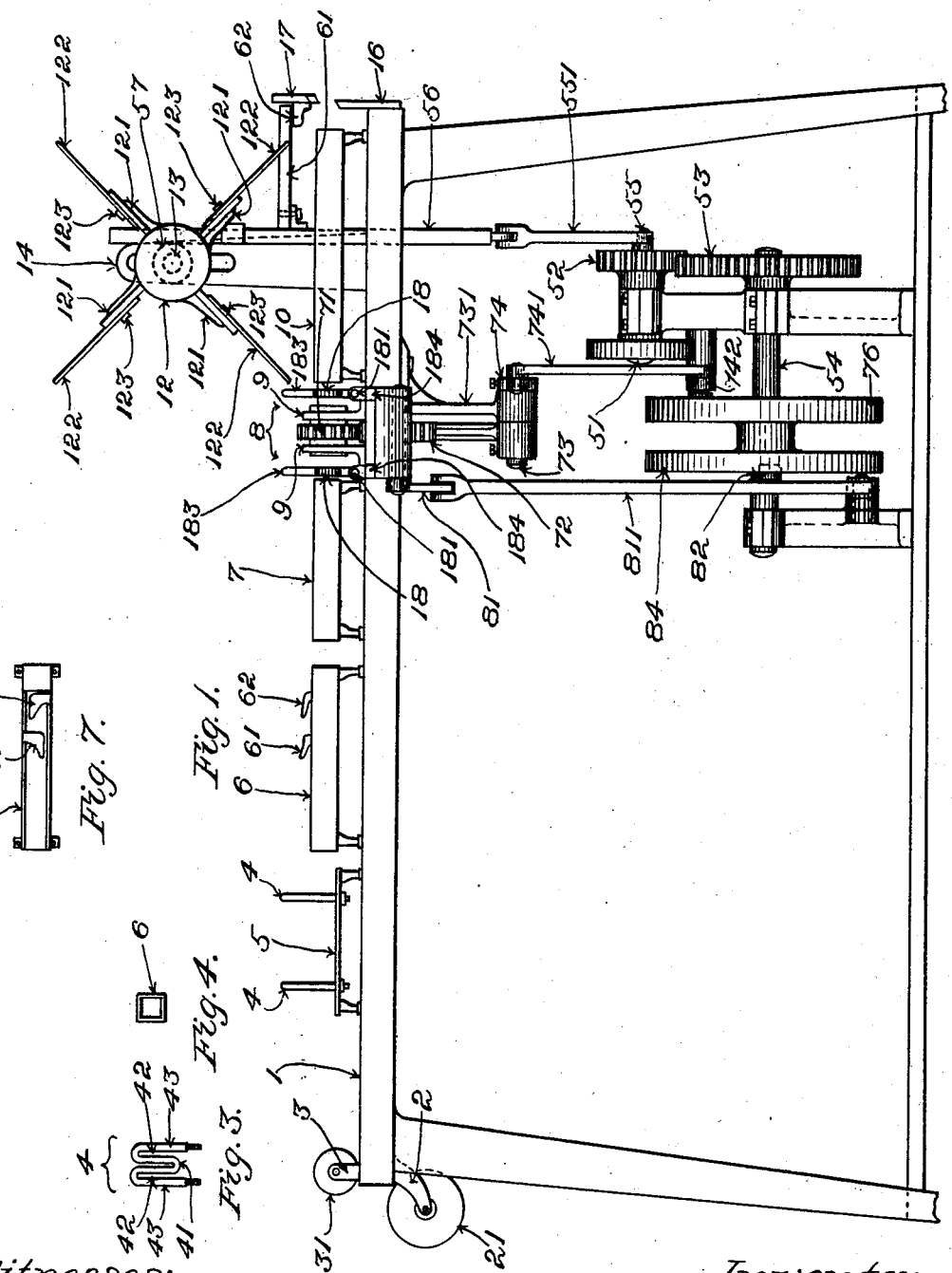
Witnesses:
Oscar F. Hill
Alice Tarr.
Inventor
Stephen M. Hamblin
By Macleod Calvert & Randall
Attorneys.

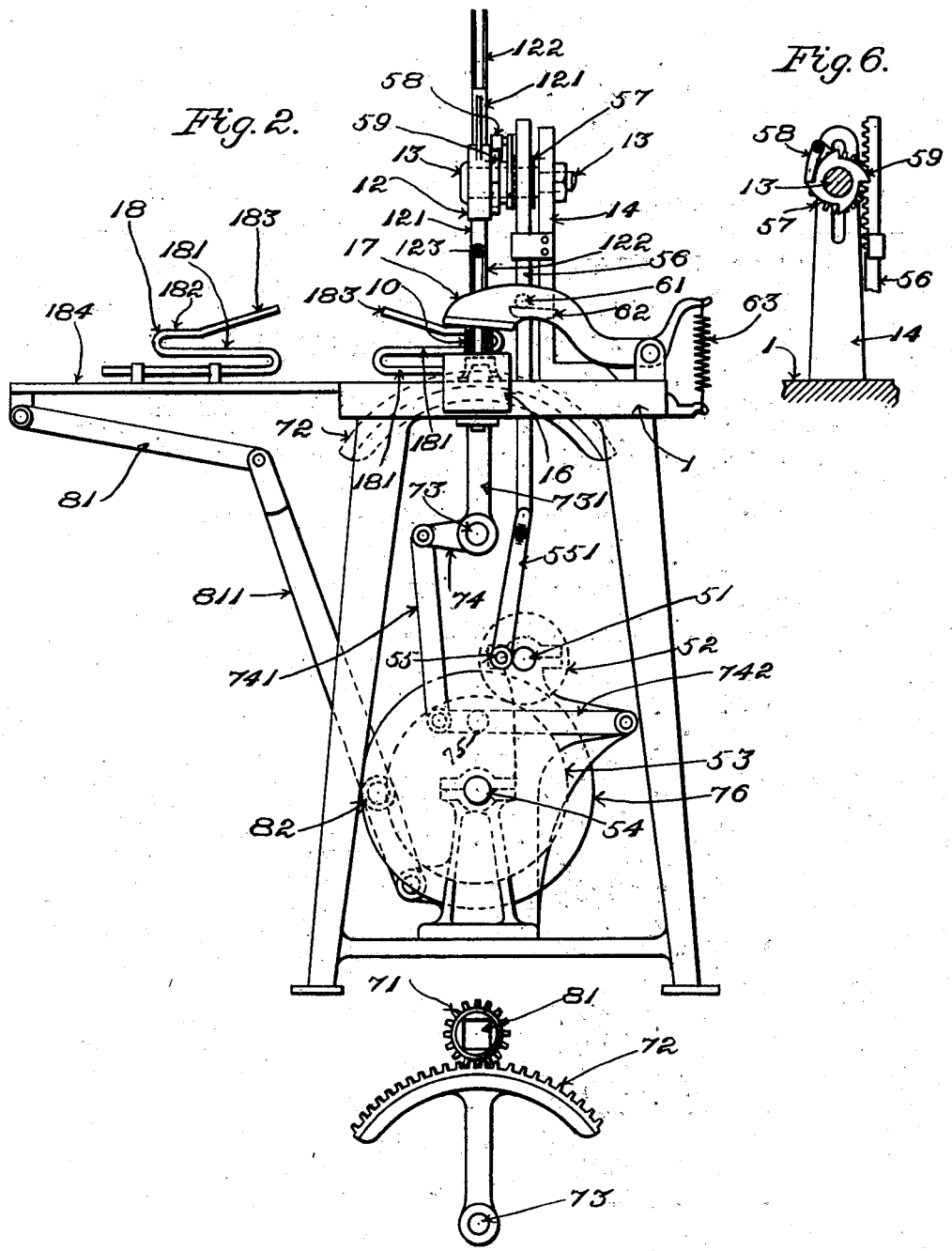

No. 753,571. Patented March 1, 1904.

UNITED STATES PATENT OFFICE.

STEPHEN M. HAMBLIN, OF READVILLE, MASSACHUSETTS.

MACHINE FOR WRAPPING CANDY KISSES, &c.

SPECIFICATION forming part of Letters Patent No. 753,571, dated March 1, 1904.

Application filed December 11, 1903. Serial No. 184,708. (No model.)

*To all whom it may concern:*

Be it known that I, STEPHEN M. HAMBLIN, a citizen of the United States, residing at Readville, in the county of Norfolk, State of Massachusetts, have invented a certain new and useful Improvement in Machines for Wrapping Candy Kisses and the Like, of which the following is a specification, reference being had therein to the accompanying drawings.

In the manufacture of some kinds of candy and the preparation of the same for the market it is the practice to inclose the respective pieces of the same in wrappers of paper and the like, the said wrappers being of such size in proportion to that of the pieces or portions of candy that when one of the wrappers is applied to a piece of candy and folded around the said piece, so as to inclose the same, a portion of the wrapper projects beyond the candy at each end of the latter. Each of the projecting portions of the wrapper is twisted one or more times upon itself for the purpose of securing the wrapper upon the candy which is contained therein and also in order to give a finished and more or less attractive appearance to the article. With the consideration in view of securing a tasty and pleasing effect the free ends of the wrapper usually are left in a wide and somewhat open or expanded and flaring state. So far as I am aware, the operation of applying and twisting the wrappers aforesaid is effected entirely by hand in practice at the present time. The services of a considerable number of persons are utilized for the purpose in some candy-manufacturing establishments. The endeavor has been made heretofore to provide means of a more or less completely automatic character for performing the work; but I know of no prior means or mechanism for the purpose which is in actual use at the present time.

The invention consists in means of novel character and construction which has been originated for the purpose of automatically applying wrappers and twisting the same as aforesaid.

The invention is intended to be utilized more especially in applying wrappers to candy—such, for instance, as the so-called molasses "kisses," which are extensively manufactured and sold, they being in the shape of oblong or elliptical small sections of molasses candy; but the invention is equally adapted for wrapping candy of other sizes, shapes, &c., as well as various articles, including fruits of different kinds.

The broader principles of the invention are capable of being embodied in mechanism of varied forms and arrangements. Herein the invention is shown embodied in a machine in which a continuous strip or web of paper from which to produce a succession of wrappers is caused to pass first through one or more guides, by which it is doubled more or less completely upon itself transversely into substantially the shape of a trough suitable to receive the pieces of candy or other articles that are to be wrapped. The said pieces or articles are laid within the trough-shaped portion of the strip or web either by hand or by the operation of suitable automatic delivering or feeding mechanism which may be provided for the purpose, as may be found most convenient or desirable in practice. The strip or web in its continued advance, with the pieces of candy or other articles applied thereto at the proper distances apart, is caused to pass devices by means of which the opposite side portions of the strip or web are bent over transversely upon the pieces of candy or other articles and so as to cause the said side portions to overlap the one with the other. In this state the strip or web, together with the pieces of candy or other articles which have been applied thereto, is caused to pass through an inclosing and confining guide. The advance or feed of the strip or web is intermittent or step by step. From the inclosing and confining guide the strip or web travels through the interior of a rotatable twister, the successive feed movements being adjusted in extent to cause the strip to come to rest temporarily after each of such movements with one of the pieces of candy or other articles within the passage of the twister and in position to be engaged by the twister, so that the said piece of candy or other article shall rotate in unison with the twister when the latter is turned. The twister is arranged to turn upon an axis which is arranged with its length in the direction of the travel of the strip or web through the machine. The twister is rotated intermittingly, it being turned around the said axis after each feed movement of the strip or web has placed a piece of candy or the like within the grasp thereof, each turning movement being sufficient in extent to produce the required amount of twist in the strip or web at the opposite sides of the said piece of candy or other article. On the delivery side of the twister is another guide, by which the strip or web is received from the twister. For the purpose of causing the twists which are produced in the strip or web by the operation of the twister to form closely adjacent to the opposite ends of the piece of candy or other article which at a given time in the operation of the machine is within the grasp of the twister clamps are provided for engagement with the strip or web adjacent the twister at the opposite sides of the latter. After each feed movement of the strip or web, whereby a piece of candy or other article contained therein is advanced into place within the grasp of the twister, these clamps are operated to engage with the said strip or web, as referred to, at opposite sides of the twister at the time of the twisting operation. Thereby the twists are caused to form at each side of the piece of candy or other article that is grasped by the twister between the same and the points of the strip or web at which the latter is held by the clamps. Through the employment of the said clamps the portion of the strip or web which is intermediate the twists that are adjacent two successive pieces of candy or other articles may be caused to remain untwisted. The feed movements of the strip or web by means of which it is caused to travel step by step through the machine may be occasioned by various arrangements of mechanism. Herein the feeding mechanism comprises an intermittingly-rotated feed device having a plurality of arms. By each movement of partial rotation of the said feed device that one of the said arms which is in position to come next into action is caused to engage with the enlargement which is constituted by a piece of candy or other article contained within the twisted strip or web at the delivery side of the twister and by acting against the said enlargement to impel the strip through the machine. Cutting or severing mechanism is arranged in position to act upon the strip between the successive pieces of candy or other articles which are inclosed thereby, and by the action of the said mechanism the strip or web is severed, so as to disconnect from each other the successive pieces of candy or other articles, each contained within its own wrapper.

In the drawings, Figure 1 shows in front elevation a machine embodying the invention. Fig. 2 shows the machine in end elevation. Fig. 3 shows in elevation one of the guides by means of which the strip of paper is given a U shape. Fig. 4 shows the cross-section of the tubular guide 6. Fig. 5 is a detail showing the twister and its actuating-segment. Fig. 6 is a sectional view showing the details of the means for operating the feeder. Fig. 7 is a top view of the tubular guide 6.

Having reference to the drawings, the main bed of the machine is shown at 1. To one end of the said bed are attached suitable stands 2 and 3, upon which are mounted guide-rolls 21 and 31, by means of which the continuous strip or web of paper from which the wrappers are to be produced is conducted on its way from a suitable source of supply—as, for instance, a wound roll. From the roll 31 the strip or web passes to the guide or guides, by which it is doubled into a trough shape preparatory to having the pieces of candy or other articles which are to be wrapped applied thereto. Two guides for the purpose are shown at 4 4. They are mounted upon a stand 5, which latter is supported by the main bed 1 of the machine. One of the guides 4 is shown detached in elevation in Fig. 3. The middle piece 41 of each of the said guides is shaped to bear upon the middle portion of the width of the strip or web, while the side portions of the said strip or web are caused to pass through the spaces 42 42 between the said middle portion of the guide and the outer sides 43 43 of the guide. The two guides 4 4 are similar in general form and character. The first thereof operates to bend the side portions of the strip or web upward partially into the required position to produce the trough shape, while the second guide completes the bending operation. From the second guide 4 the trough-shaped strip or web passes to the rear end of the first conducting-guide 6. The latter is shown in plan in Fig. 7. It is mounted upon the main bed of the machine. The rear end thereof is open-topped to permit pieces of candy or other articles which are to be wrapped to be deposited from above within the hollow of the trough-shaped strip or web, which latter at this point is supported below and at its sides by the bottom and side portions of the conducting-guide 6. The forward portion of the conducting-guide 6 is provided with the turners 61 and 62, which last are arranged to act successively against the opposite side portions of the strip or web. By means of the said turners 61 and 62 the opposite side portions of the strip or web of paper are turned inward and folded down upon each other, thereby being caused to overlap. From the first conducting-guide 6 the strip or web, with the pieces of candy or other articles inclosed thereby, passes to the second conducting-guide 7. The second conducting-guide is tubular, and so, also, is the forward end of the first conducting-guide, so that the strip or web and contained candy or other articles pass through the interior thereof, and the passages through the conducting-guides 6 and 7 correspond substantially in cross-section with the cross-section of the pieces of candy or other articles. Fig. 4 shows the forward end of the first conducting-guide in cross-section.

The twister is shown at 8, it being provided with journals which are mounted to turn in bearings 9 9, rising from the main bed 1. The passage through the twister is shown at 81, (see Fig. 5,) the twister being arranged with the said passage in line with that of the second conducting-guide and the strip or web being led from the first conducting-guide through the passage of the twister. The twister is constructed to engage with or grasp the successive pieces of candy or other articles as they respectively come into position within the same at the ends of the successive feed movements of the strip or web. The engagement or grasping action may be provided for variously; but usually I provide therefor by shaping the passage through the twister so as to correspond in cross-section with the pieces of candy or other articles when the latter are irregular or angular in cross-section. In the drawings (see more partiularly Fig. 4) the passage through the twister is rectangular in cross-section and is suitable for engagement with a piece of candy or other article which is oblong or rectangular in cross-section. The conducting-guide at the delivery side of the twister is designated 10. It is supported from the main bed 1 of the machine. At the end next the twister the said guide 10 is tubular, so as to inclose the piece of candy or other article which temporarily occupies the said end, while farther along in its length the said guide is open at one side thereof, herein the top side, (see Fig. 2,) to permit the arms of the feeder to work therethrough in order to engage with the enlargements that are constituted by the pieces of candy or the other articles that are inclosed by the strip or web and move the same along through the said tube in feeding the strip or web through the machine. The feeder comprises, essentially, a hub or wheel 12, which latter is mounted upon a stud 13, that is carried by a post or pillar 14, rising from the main bed 1, the said hub or wheel having radial arms 121 121, &c., from which extend also radially-forked members 122 122. The side branches of each of these arms in turn as it is brought into action by the turning movement of the feeder pass on opposite sides of the strip or web and by pressing against the rear side of one of the enlargements aforesaid push the said enlargement onward along the conducting-guide 10, thereby effecting the feed. The forked members are held to the arms 122 122, &c., by means of clamping-screws 123 123, &c. The severing means by which the strip or web is severed intermediate the pieces of candy or other articles inclosed by the said strip or web comprise, essentially, the fixed jaw or blade 16 and a movable blade 17.

The clamps by means of which the strip or web is engaged adjacent the opposite ends of the twister and between the said twister and the proximate ends of the two conducting-guides 7 and 10 are designated 18 18. As will be perceived, each clamp is formed of wire bent into shape and formed into a lower horizontal portion 181, an upper horizontal portion 182, and an upwardly-inclined guiding portion 183, constituted by the end portion of the upper horizontal portion 182. The clamps 18 18, &c., are mounted upon a slide 184, which is supported upon the main bed 1 with capacity to move transversely with reference to the twister and the conducting-guides.

In the operation of the machine, the strip or web, with pieces of candy or other articles inclosed thereby at the proper distances apart, having been drawn forward through the conducting-guides and twister, so as to locate one of the said pieces or articles within the passage of the twister, the clamps are first moved into position to engage with the strip or web at the opposite ends of the twister and between said ends and the approximate ends of the adjacent conducting-guides 7 and 10. In this movement of the clamps the upward inclination of the guiding portions 183 183 thereof facilitates the entrance of the strip or web into the narrow space between the upper and lower engaging portions 182 181. Through being compressed in the said narrow space the respective portions of the strip or web are clamped and held from turning under the action of the twister. The twister is now turned to an extent sufficient to produce the required twist in the strip or web at the opposite ends of the piece of candy or other article. The clamps are then withdrawn so as to disengage them from the strip or web, and the latter is fed forward until the next piece of candy or other article is brought within the grasp of the twister. Thereupon the strip or web is again clamped at opposite ends of the twister and the twister is again turned, after which the clamps are disengaged and the strip or web is then fed forward through the engagement of one of the arms of the feeder with the piece of candy or other article which previously was carried past the twister. In order that by the pull upon the strip or web which is communicated thereto by the feeding mechanism the paper may not become untwisted after passing the twister, the twister is actuated so that the twist between two successive pieces of candy or other articles shall be formed in the same direction. In other words, the twister is actuated so that the twist next succeeding one piece of candy or other article and the twist next preceding the following piece of candy or other article shall be formed in the same direction. This is accomplished by operating the twister to turn in one direction when operating in connection with one piece of candy or other article and to turn in the opposite direction when operating in connection with the next succeeding piece of candy or other article, and so on throughout the working of the machine.

The actuating connections for the various working parts may vary in practice. In the present instance I have shown a driving-shaft 51, which is provided with a spur-pinion 52, that meshes with a spur-gear 53 upon a cam-shaft 54, the two shafts 51 54 being mounted in suitable bearings upon the frame of the machine. The cam-shaft 54 is arranged to rotate at the rate of one revolution thereof to two revolutions of the driving-shaft. The spur-pinion 52 is provided with a crank-pin 55, the latter being connected by a rod 551 to a rack-bar 56, the teeth of which last mesh with a pinion 57, mounted upon the supporting-stud 13 of the feeder and having connected therewith a pawl 58, which is arranged to engage with the teeth of a four-toothed ratchet-wheel 59, fast with the wheel or hub of the feeder. Thereby the feeder is rotated intermittingly. The rack-bar carries a pin 61, which in the movement of the said bar strikes against the projection 62 of the movable blade of the severing-blade, thereby moving the movable blade in one direction, the said blade being moved in the opposite direction by a spring 63. The twister has in connection therewith a pinion 71, meshing with the teeth of a segment 72, the latter being mounted upon a short shaft 73, which is mounted in a bearing 731, extending downward from the main bed. The said short shaft is provided with an arm 74, which is connected by a rod 741 to an arm 742, carrying a pin or roll 75, that is engaged by a cam 76 upon the cam-shaft. Through the action of the cam the segment is moved at the required times to operate the twister. The slide 184, which carries the clamps, is connected by a rod 81 with a lever 811, the latter having a pin or roll 82 working in the groove of a cam 84 upon the cam-shaft. Through the action of the said cam the slide carrying the clamps is operated. It will be observed that a double arrangement of the clamps is carried by the slide in order that by the movement of the slide in one direction the two clamps at one end of the slide may be caused to engage with the strip or web, while by the return movement of the said slide the other two clamps are caused to engage with the strip or web. In the intermediate position of the slide both pairs of clamps are out of engagement with the strip or web.

I claim as my invention—

1. In combination, means for doubling a continuous strip or web of wrapping material into trough shape, means for folding the side portions of said web down upon pieces of candy or other articles placed upon the strip or web, a rotatable twister having a passage through which the strip or web is passed, guides for the said strip or web at opposite ends of the said twister, and clamps to engage with the strip or web at the opposite ends of the twister between the said ends and the proximate ends of the guides.

2. In combination, means for folding the side edges of a continuous strip or web of wrapping material down upon pieces of candy or other articles placed upon the said strip or web, a rotatable twister having a passage through which the strip or web is passed, clamps to engage with the strip or web at the opposite ends of the twister, and automatic feeding means to feed the strip or web through the machine.

3. In combination, a conducting-guide provided with means for turning the side portions of a strip or web down upon pieces of candy or other articles placed upon the said strip or web, a rotatable twister, guides for the strip or web adjacent the opposite ends of the twister, clamps to engage with the strip or web between the ends of the twister and the said guides, feeding means to feed the strip or web through the machine, and severing means to sever the strip or web intermediate successive pieces of candy or other articles.

4. In combination, means for folding the side portions of a strip or web over upon pieces of candy or other articles placed at intervals upon the said strip or web, a rotatable twister, having a passage through which the strip or web and the candy or other articles contained therein are passed, and constructed to grasp the said pieces or other articles, guides through which the said strip or web passes located at the opposite ends of the said twister, clamps between the opposite ends of the twister and the said guides to engage with the said strip or web, feeding means for the strip or web, and means to sever the strip or web between successive pieces of candy or other articles after passing the twister.

5. In combination, means for folding the side portions of a strip or web over upon pieces of candy or other articles placed at intervals upon the said strip or web, a rotatable twister through which the strip or web and the candy or other articles contained therein are passed, guides at the opposite ends of the said twisters, opposite pairs of clamps arranged to act between the ends of the twister and the said guides to engage with the said strip or web, feeding means for the strip or web, means to rotate the twister in opposite directions after successive feed movements, a carrier for the said clamps, and means to operate the said carrier to bring the respective pairs of clamps alternately into action.

In testimony whereof I affix my signature in presence of two witnesses.

STEPHEN M. HAMBLIN.

Witnesses:
CHAS. F. RANDALL,
WILLIAM A. COPELAND.